July 28, 1970 D. J. PAGE 3,522,135
ROTATING HEAT SEALING HEAD WITH COOLING MEANS
Filed April 29, 1968 5 Sheets-Sheet 1
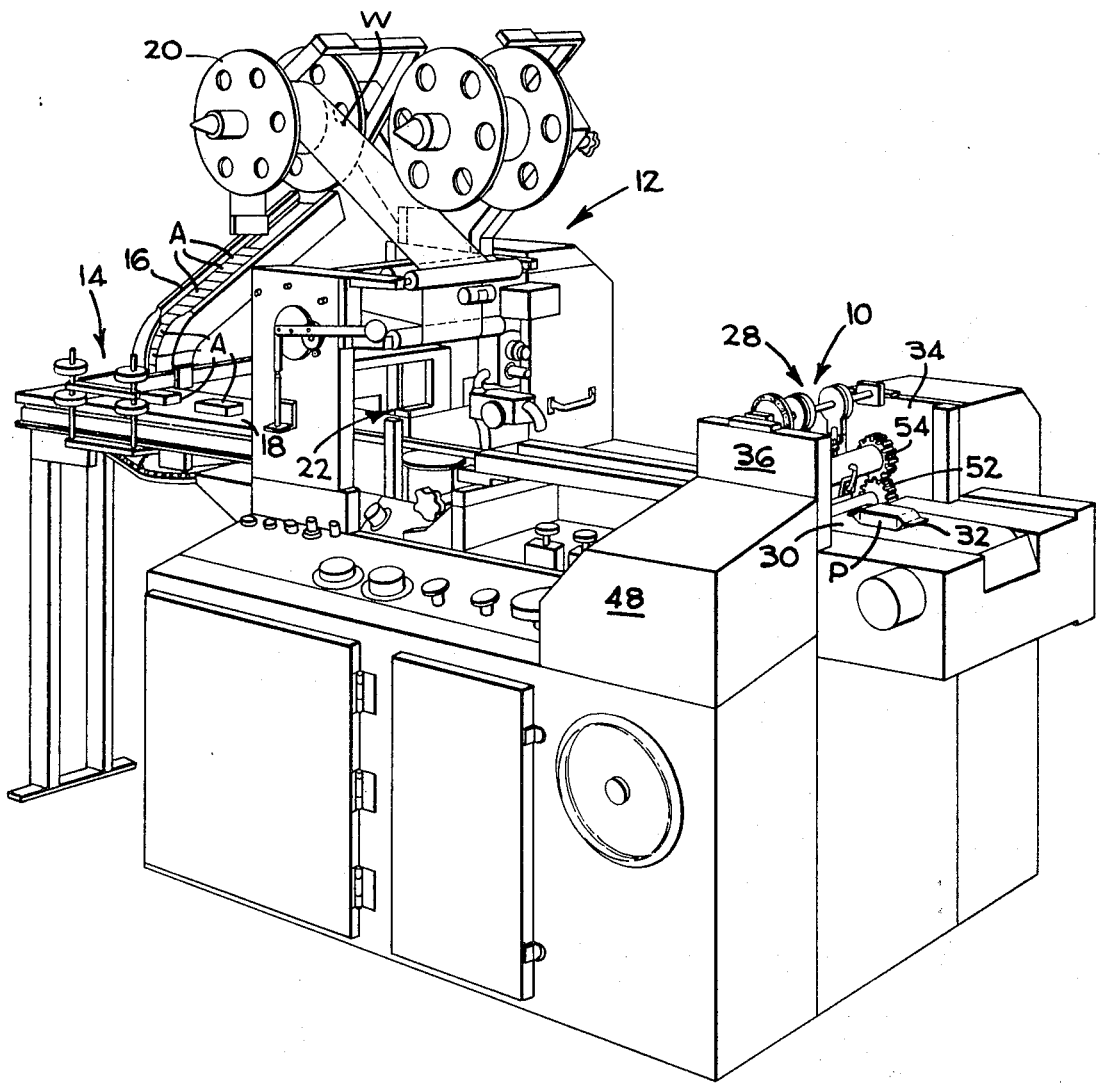
FIG_1
INVENTOR.
DONALD J. PAGE
BY *J. W. Anderson*
*C. C. Tripp*
ATTORNEYS

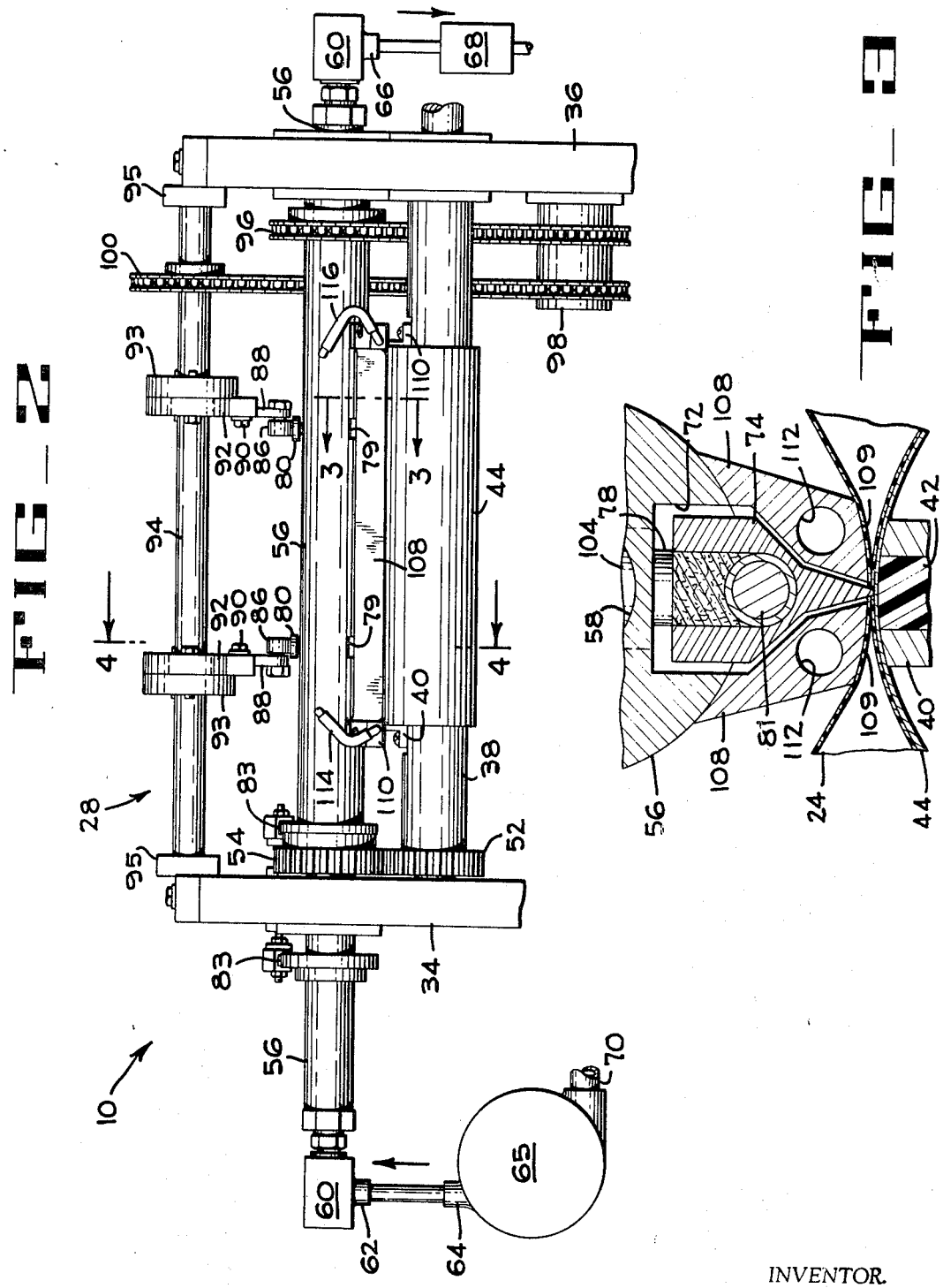

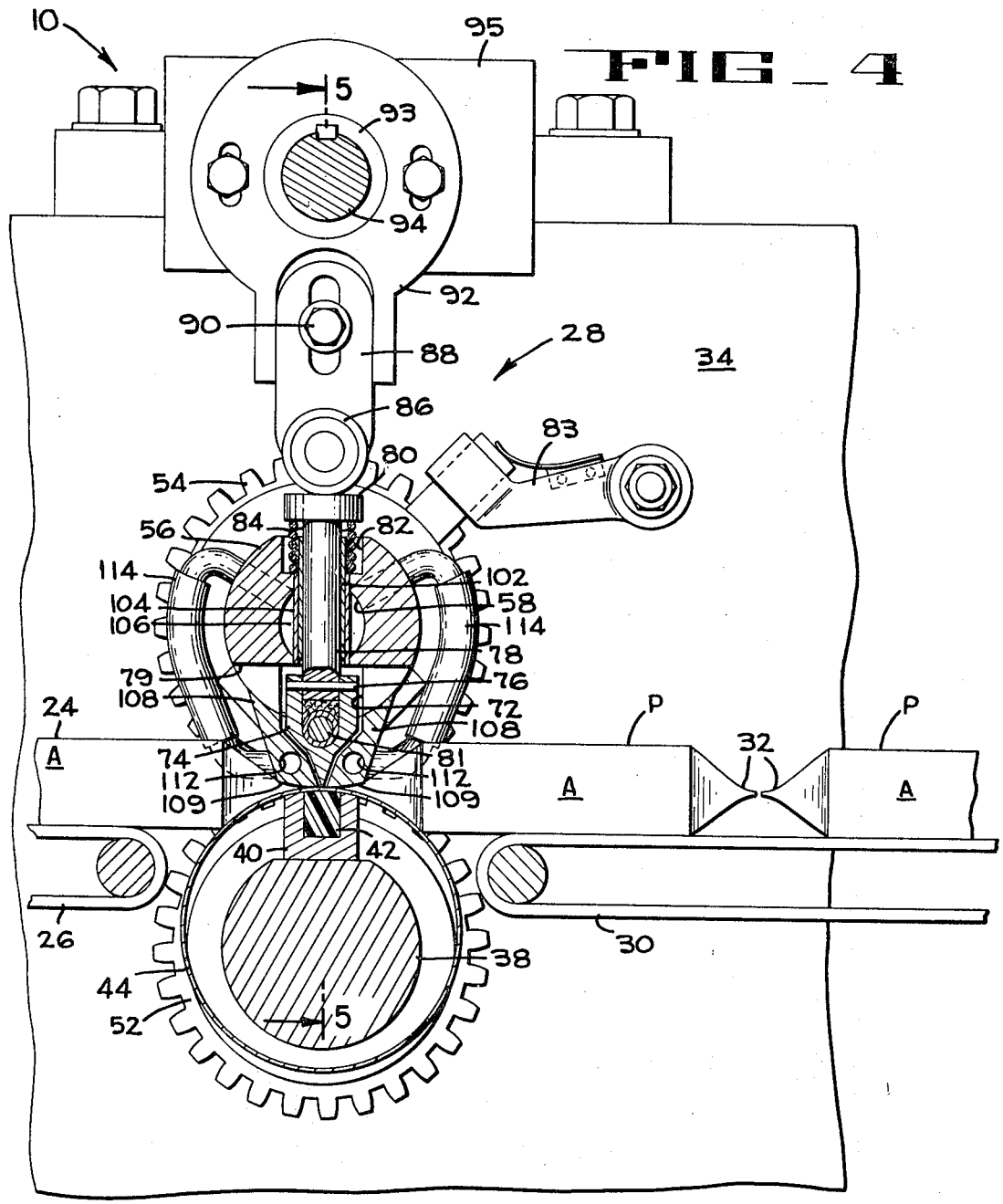

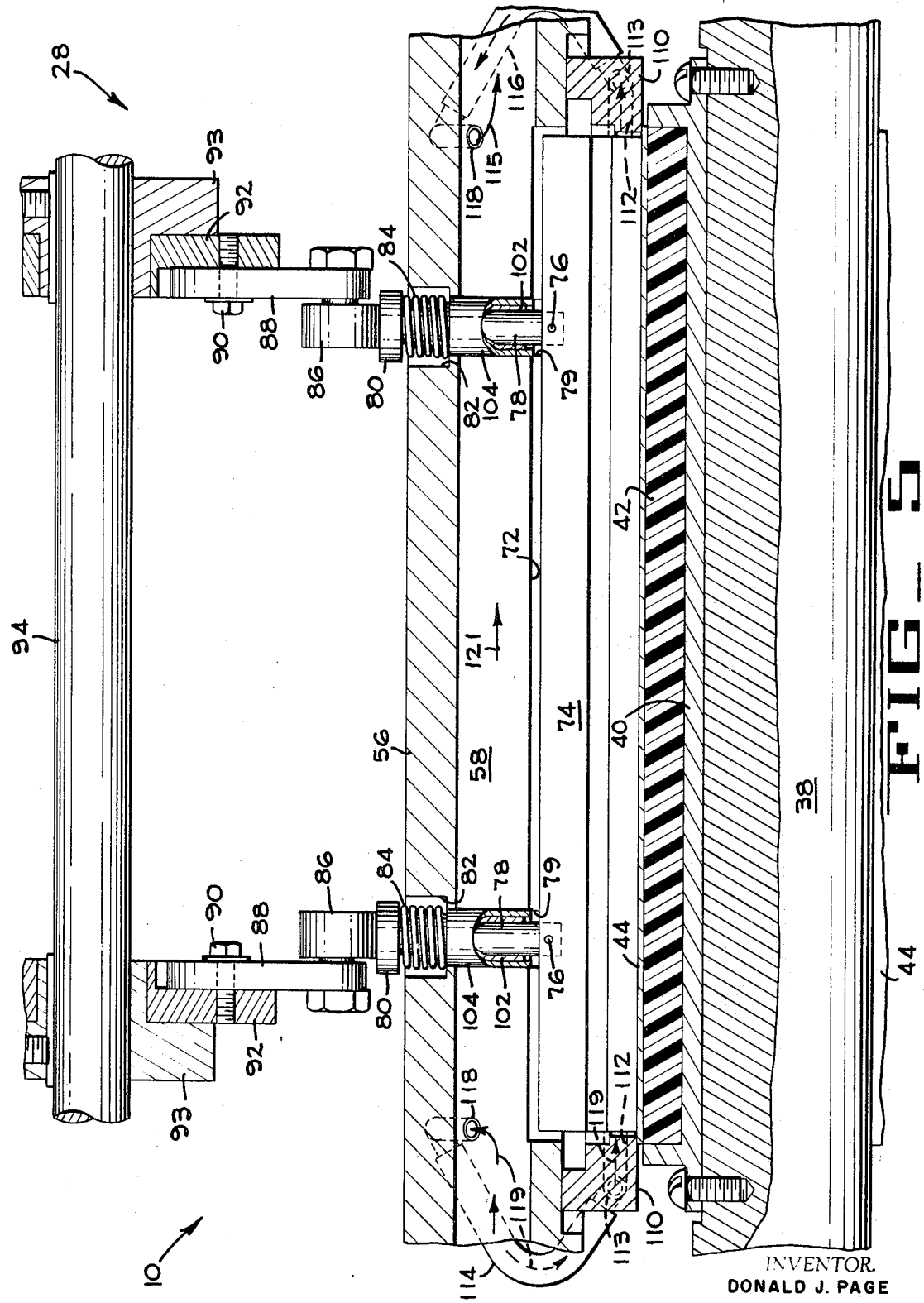

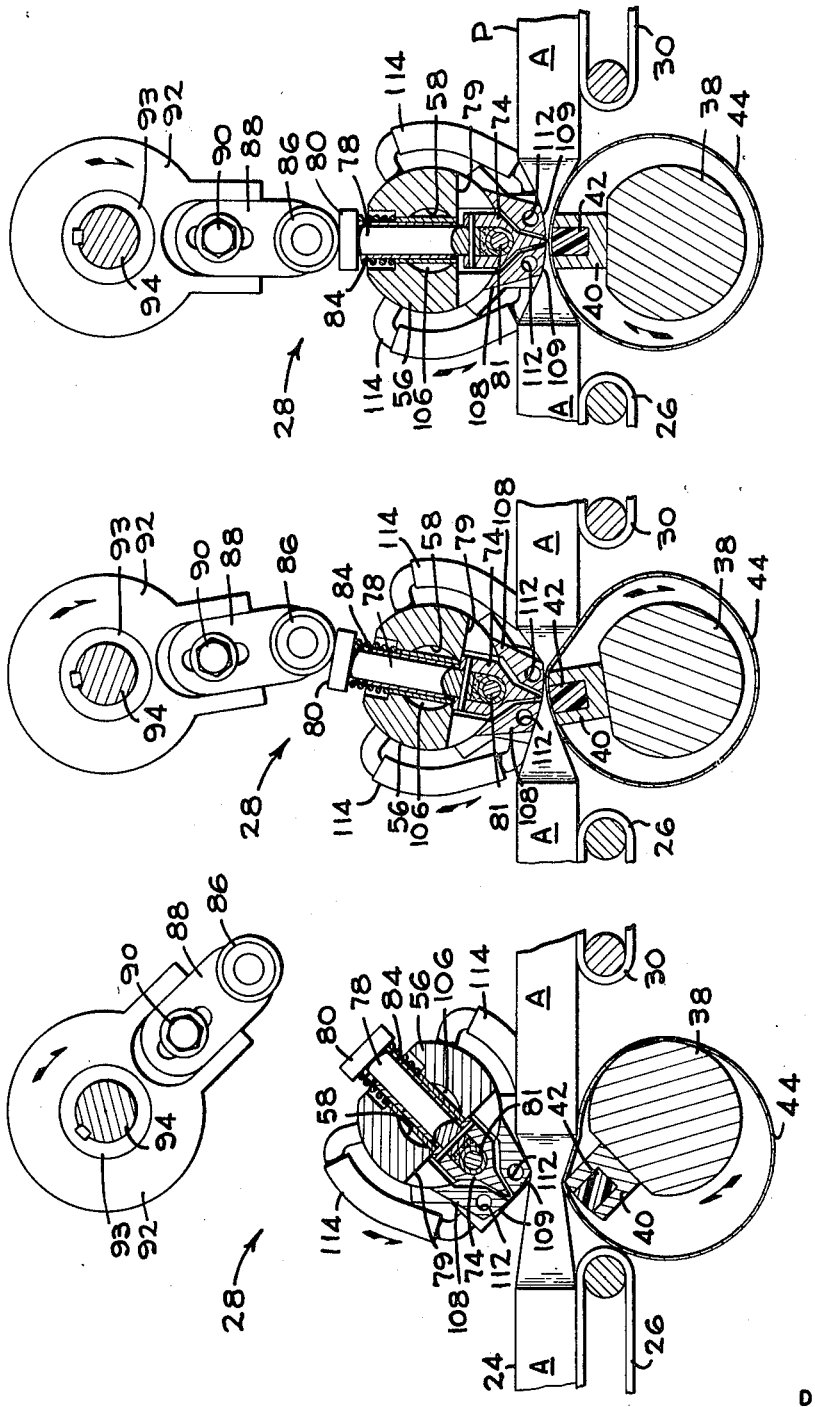

United States Patent Office 3,522,135
Patented July 28, 1970

3,522,135
ROTATING HEAT SEALING HEAD WITH
COOLING MEANS
Donald J. Page, Green Bay, Wis., assignor to FMC Corporation, San Jose, Calif., a corporation of Delaware
Filed Apr. 29, 1968, Ser. No. 724,834
Int. Cl. B30b 15/34; B32b 31/18, 31/20
U.S. Cl. 156—583          7 Claims

ABSTRACT OF THE DISCLOSURE

A continuously operated wrapping machine which encloses spaced articles in thermoplastic material is provided with a liquid cooled mounting shaft having a constantly energized rotary sealing (and cutting) bar operating through a radially apertured, liquid cooled gripper element in order to minimize heat transfer from the sealing bar to adjacent parts. Because the sealing bar is thus isolated, relatively high operating temperatures and, correspondingly, minimal time periods for sealing and cutting can be used to achieve more rapid than usual operating speeds.

BACKGROUND OF THE INVENTION

The present invention pertains to a continuous wrapping machines which encase articles in a thermoplastic web that is welded or bonded together with heat. More particularly, the invention concerns the sealing head, in which a heated sealing bar effects the weld and severs the web. At present, operating speeds for continuously energized sealing bars are limited because the heat from the sealing bar tends to migrate to adjacent parts after prolonged operation. This heat can render the web tacky and difficult to process, or in more extreme instances can cause inadequate or imperfect seals. In some known types of continuous wrapping machines, the sealing and serving operation on the trailing end of a package is effected while the package is on a takeaway conveyor operating faster than the delivery speed of the packages to the sealing apparatus. As a result, if the web is softened or melted adjacent the seal, the downstream portion of the web can be drawn away from the seal area and produce elongate filaments. This not only produces a ragged, imperfect seal, but may require shutdown of the wrapping machine for cleaning. Other types of wrapping machines use periodically energized sealing elements so as to reduce the probability of heat transfer to adjacent parts and to areas of the web adjacent the area to be sealed. This also imposes obvious limitations on the operating speed of the machine.

When used with a continuous wrapping machine which usually requires about 1/10 of a second for each sealing operation, the heat sealing head of the present invention can reduce the sealing time to a fraction of the time presently required. This rapid sealing is accomplished with a continuously energized and hotter than usual sealing and cutting bar with a special liquid-cooled mounting shaft and heat barriers that function as gripping jaws to keep the web taut and planar along the seal line. In practical terms, the invention can increase the output of a machine with a sealing head requiring 1/10 of a second for each seal and producing 30 packages per minute, to 150 or more packages per minute.

SUMMARY OF THE INVENTION

A liquid cooled heat barrier and mounting shaft substantially surrounds a continuously energized, electrically heated sealing and cutting bar which operates at a temperature higher than the melting range of the plastic webs to be bonded. The sealing bar is only briefly and minimally projected out of the barrier to effect the sealing and cutting of the web. Since the heat is thus localized and confined to the web area to be bonded and severed, the sealing bar can be maintained at high temperature and heat seal and sever the web with a very rapid operating stroke. Thus, a wrapping machine incorporating the present invention can operate faster than comparable wrapping machines presently in use.

BRIEF DESCRIPTION OF THE DRAWINGS

FIG. 1 is a perspective of a known type of wrapping machine for enclosing articles in heat-sealed thermoplastic material, and employing the sealing head of the present invention.

FIG. 2 is a schematic transverse section, viewed in a downstream direction, of the heat sealing head shown in FIG. 1.

FIG. 3 is an enlarged fragmentary section taken along lines 3—3 on FIG. 2.

FIG. 4 is an enlarged vertical section taken along lines 4—4 on FIG. 2.

FIG. 5 is a fragmentary vertical section taken along lines 5—5 on FIG. 4, and particularly illustrates the circulation paths of coolant through the sealing head.

FIGS. 6-8 are operational views, similar to FIG. 4, illustrating successive operational positions of the sealing head transversely sealing and cutting the tubular web between spaced articles.

DESCRIPTION OF THE PREFERRED EMBODIMENT

The liquid-cooled heat sealing head assembly 10 (FIG. 1) of the present invention may be incorporated in various known wrapping machines, such as the continuous wrapping machine 12 which operates substantially as disclosed in U.S. Pat. 2,546,721. At its product input end 14, the wrapping machine 12 is fed a series of articles A from a delivery conveyor 16. The articles are deposited in spaced relation upon a continuously operated article conveyor 18 and progress along a linear path through the various stations of the machine to produce individual sealed packages P of the articles. Using the heat sealing head 10, the wrapping machine 12 can handle various thermoplastic wrapping materials such as polyethylene film.

A web W of polyethylene film is continuously fed from an overhead spool 20 downward into a forming station 22. As the articles progress through the forming station, the web is formed into a longitudinally sealed tube 24 (FIG. 4) around the articles A. The entubed articles progress from the forming station 22 on a belt conveyor 26 through a sealing and cutting station 28 where the sealing head assembly 10 pinches the tube 24 together between adjacent articles, and transversely heat seals and severs the web. When the web is severed at the trailing end of a package P, the package is supported by a discharge conveyor 30 which operates at a slightly faster lineal speed than the conveyor 26 in order to separate the packages. In some instances the packages may be considered finished at this stage; in other instances, auxiliary mechanism, not shown, may tuck and seal the projecting gable ends 32 of the wrapping material against the body of the package.

One disadvantage of thermoplastic film wrapping material, such as polyethylene, is that heretofore the heat sealing operation has imposed speed limitations because heat tends to migrate throughout the sealing head assembly, and especially to parts adjacent the heated sealing bar which might also contact the web. After a prolonged operating period, these heated parts can adversely affect the thermoplastic film. To prevent this heat migration, sealing bars are sometimes provided with heat shields, but it is usually the case that heat is ultimately transferred away from the sealing bar to the extent that it prematurely softens or melts the web. This interferes with the desired operation of the machine, limits the operating speed, and can produce imperfect seals.

The present invention eliminates the above stated disadvantages of conventional sealing heads and permits continuous operation for prolonged time periods. These results are accomplished by means including (1) hollow gripper jaws mounted on a hollow shaft and circulating a coolant through the shaft and jaws, and (2) a roller-actuated retractable sealing bar which dwells within the confines of the gripper jaws and has its operative edge only minimally projected for a brief instant against and through the web material.

The sealing and cutting station 28 (FIGS. 2 and 4) includes upright side plates 34 and 36 which rotatably support three vertically aligned shafts. Lowermost is a driven anvil shaft 38 which carries a radially projecting, outwardly open anvil holder 40. A relatively hard Teflon (tetrafluoroethylene) anvil bar 42 is secured in the open side of the holder. The anvil bar has a transversely arcuate face which travels with the web and conforms to an arc struck from the axis of rotation of the anvil shaft 38. The anvil shaft 38 lies wholly below a horizontal plane including the conveying surfaces of the conveyors 26 and 30 so as to allow free passage of the web and articles, and the arcuate face of the anvil is about mid-high of the articles when on top dead center. A floating cylindrical sleeve 44 of Teflon-impregnated glass cloth is mounted on the anvil shaft 38 to provide the known function of a web support which does not adhere to molten plastic.

Bearings, not shown, rotatably mount the anvil shaft 38 in the side plates 34 and 36, and the shaft projects through the side plate 36 to a variable speed drive unit mounted within an enclosure 48 (FIG. 1). At its other end, the shaft 38 carries a gear 52 that is meshed with a gear 54, of the same size, that is mounted on a hollow sealing bar shaft 56. Due to the gear interconnection of the shafts 38 and 56, they rotate at the same speed in opposite directions.

The sealing bar shaft 56 is provided with a coextensive bore 58 (FIGS. 4 and 5) and a swivel coupling 60 at each end of the bore. Internally, each swivel coupling provides sealed, fluid communication with the bore 58 of the rotating sealing bar shaft 56 while the exterior body of the coupling is immobile. An inlet 62 of one swivel coupling is connected to the discharge outlet 64 of a pump 65. The other swivel coupling is provided with an outlet 66 that is connected to a heat exchanger 68, the heat exchanger being in turn connected to the suction inlet 70 of the pump. Water is circulated through the closed-circuit cooling system including the bore 58, pump 65 and the heat exchanger 68.

A longitudinal groove 72 in the sealing bar shaft 56 is provided for an electrically heated sealing bar 74. As best shown in FIG. 5, each end portion of the sealing bar 74 is connected by a pin 76 to a push rod 78 that extends diametrically across the bore 58 and through the sealing bar shaft 56. In order to install or remove the sealing bar 74, a transverse slot 79 in the sealing bar shaft 56 adjacent each pin 76 provides access to the pin. A compression spring 84 is mounted between an enlarged striker head 80 on each push rod and the bottom wall of a bore 82, so that the sealing bar 74 is normally retracted into the groove 72.

The sealing bar 74 (FIG. 3) is approximately U-shape in cross section with a depending V-shaped working edge, the apex of which effects the sealing and cutting of the web. For heating the sealing bar, a resistance heating element 81 is mounted in the base of the U-shaped portion. The heating element 81 is electrically energized from a low voltage source in a conventional manner by two commutator ring and brush units 83 that are mounted near the sidewall 34; the outermost unit is grounded to the sealing bar shaft, and the inner unit has a wired connection, not shown, to the heating element. The tubular heating element 81 is seated on an arcuate wall of the sealing bar to provide the most efficient heat transfer to the sealing bar, and the space between the upright walls of the sealing bar is filled with asbestos fiber cement so that the heat from the element 81 will not readily be transferred to the sealing bar shaft 56 and the push rods 78.

When the wrapping machine 12 is in operation and the sealing bar 74 approaches the vertical alignment with the anvil 42 shown in FIG. 4, the striker heads 80 are simultaneously contacted by associated rollers 86 which function as camming surfaces to project the heated sealing bar 74 toward the anvil 42. Each roller 86 is pivoted to a slotted arm 88. The arm is secured by a bolt 90 in a selected position radially of a rotatably adjustable mounting disc 92 that is bolted to a hub 93. The hub is keyed to a mounting shaft 94 that is rotatably mounted in bearing brackets 95 secured atop the side plates 34 and 36.

For rotating the roller shaft 94 synchronously with the anvil shaft 38 and the sealing bar shaft 56, the sealing bar shaft 56 (FIG. 2) is provided with a chain and sprocket drive connection 96 to a reversing gear unit 98. A chain and sprocket output drive connection 100 from the gear unit 98 to the roller shaft 94 rotate the roller shaft in the same direction as the anvil shaft 38 and at the same speed.

Referring again to FIGS. 4 and 5, each of the push rods 78 is slidably mounted in a bushing 102 that is pressed into a sleeve 104. Sleeve 104 extends across the bore 58 and has both circumferential end portions welded in fluid sealing relation to the sealing bar shaft 56. As shown in FIG. 4, the resulting gap at 106 between the exterior of the sleeve 104 and the interior wall of the bore 58 provides a flow path for coolant into the central portion of the bore 58, and the sleeve 104 restricts such flow.

Two complementary, integrally formed gripping jaws 108 are mounted on the sealing bar shaft 56, and have inner surfaces which conform to and are closely spaced from the outer surfaces of the sealing bar 74. The arcuate end faces 109 of the gripping jaws confront the anvil 42 and lie outwardly beyond the working edge of the sealing bar 74 when the sealing bar is in its retracted position within the groove 72. In order to permit rolling contact into and out of pressure engagement with the Teflon impregnated glass cloth sleeve 44 (FIG. 3) that lies on the arcuate face of the anvil 42, the end faces 109 are equidistant from the axis of the sealing bar shaft 56.

At each end, the gripping jaws 108 (FIGS. 2 and 4) are interconnected by mounting pads 110 that are bolted to the sealing bar shaft 56. A special feature of the invention is that each gripping jaw 108 (FIGS. 3 and 4) is provided with a longitudinal passage 112 in fluid communication with the bore 58 in the sealing bar shaft 56. For this purpose, conduits 114 and 116 (FIGS. 2 and 5) at the end portion of each passage 112 are in fluid transfer relation with the bore 58. The flow path for fluid in the conduits 114 and 116 includes radial apertures 118 of the sealing bar shaft 56, and passages at 113 that extend through the gripping jaw mounting pads 110 into the jaw passages 112.

With reference to FIGS. 4 and 5, the cooling liquid (indicated by the arrow 119, FIG. 5) transferred by the pump 65 into the bore 58 is prevented from free travel through the bore by the adjacent push rod sleeve 104 which provides a flow restriction. Accordingly, only a part of the cooling liquid (arrow 121) is transferred through the gaps 106 into the bore portion intermediate the two push rod sleeves 104. Other portions of the incoming cooling liquid are thus diverted into the two adjacent radial apertures 118, through the two conduits 114, and into the longitudinal passages 112 through the gripping jaws 108. It is evident, therefore, that the sleeve 104 restricts flow into the central portion of the bore 58 so as to effect positive flow diversion and circulation through the gripping jaw passages 112.

The other ends of the gripping jaws and sealing bar shaft are similarly constructed but oppositely oriented to the parts already described. Accordingly, the cooling liquid from the gripping jaw passages 112 is returned to the bore 58 (arrow 115) by the conduits 116, and the cooling liquid in the central portion of the bore 58 passes around the second sleeve 104 to blend with the previously diverted liquid being returned through the heat exchanger 68 to the suction inlet of the pump 65. In the foregoing manner, the gripping jaws 108 (FIG. 3) are maintained at a temperature lower than the melting point of the thermoplastic web to prevent heat damage which might otherwise occur after a prolonged operation of the sealing head assembly 10.

The tubular web 24 (FIGS. 6-8) with the spaced articles A enclosed therein is advanced in timed relation to the sealing head assembly 10, and between the anvil shaft 38 and the sealing bar shaft 56. Moving with and at the same speed as the web, the leading edge of the anvil holder 40 and the leading edge of one of the gripping jaws 108 contact and compress the tubular web near the trailing end of the leading article. Due to the cooling liquid circulating through the gripping jaws 108, the jaw surface temperature is maintained well below the melting point of the web material. Because the sealing bar 74 is completely within the confines of the gripper jaws, there is no danger of melting or dangerously softening the web while the cooperating gripping jaws 108, anvil 42, and anvil holder 40 move through the FIG. 7 to the FIG. 8 full gripping position.

When the roller 86 (FIG. 7) contacts the push rod head 80, the roller and push rod 78 are about 10 degrees out of vertical alignment due to the relatively short throw required to project the sealing bar 74 into its FIG. 8 sealing and cutting position. Therefore, the sealing bar 74 is exposed for only about 20 degrees of its 360 degree rotation between sealing and cutting operations.

The following example points out the brief exposure of the sealing bar 74 under one set of operating conditions: When the wrapping machine 12 is adjusted to perform about 180 sealing and cutting operations per minute, or 90 finished packages, each sealing and cutting operation has a duration of ⅓ of a second. The shafts 38, 56 and 94 must thus rotate three revolutions per second. Therefore, the total time interval which the sealing bar 74 is actuated by the rollers 80 and push rods 78 is about 1/54 of a second, but the working edge, or sealing and cutting portion of the sealing bar is projected out of the confines of the gripper jaws 108 for a shorter time because it is slightly recessed in its clearance passage and is only fully projected at bottom dead center.

The significance of the foregoing operating conditions is that heat exposure of the web material to the sealing bar both before, during and after sealing and severing the web is for such a short time that the web portions adjacent the seal line are not melted or damaged, and that the sealing bar can be maintained at a heat higher than the melting point of the web material because the liquid-cooled gripping jaws and sealing bar shaft effectively confine the heat to the sealing bar. With various thermoplastic webs, such as polyethylene, excellent sealing and severing can be achieved for extended operating periods with the sealing bar heated much higher than the melting range of the web. Further, when the severed leading package P (FIG. 4) is pulled away from the succeeding package, the seal line is clean cut because the very rapid sealing action promotes rapid cooling. In other words, because there is no damaging heat migration into the web from the seal area, the severed web exhibits virtually no tendency to become ragged when the packages are separated after the sealing bar severs the web.

The cooperative functions of the anvil 42, anvil holder 40 and gripper jaws 108 are also important in that the web 24 is pinched together by these elements (FIG. 6) to remove any wrinkles, is smoothed out by the rolling contact of the gripper jaws and anvil surfaces as shown in FIG. 7, and is firmly gripped in such condition during the cutting and sealing operation shown in FIG. 8.

It should also be noted that while the Teflon-impregnated, glass-fiber sleeve 44 functions in the usual manner to provide a web support surface to which melted plastic webs will not adhere, its unique floating mounting on the anvil shaft 38 eliminates the usually required drive roller, idler roller, tensioning device and other structure when the conventional belt type of support is used. Because the sleeve is floating, it has a tendency to slip relative to the anvil shaft before the web is contacted. In this manner, the sleeve continuously presents a different surface to the web for each web sealing and severing operation.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for heat sealing and severing a continuous multiple-layered web comprising an anvil, means mounting said anvil for movement around a first rotational axis at one side of the web, a heated sealing bar, means mounting said sealing bar for movement around a second rotational axis at the other side of the web, a pair of hollow gripper jaws straddling and conjointly rotatable with said sealing bar about said second axis, said gripper jaws cooperatively defining a slot through which said sealing bar is projected for sealing and severing the web, a drive train synchronously rotating said anvil and said sealing bar to successively index said anvil and said gripper jaws into alignment across the web, camming means mounted for rotative movement about a third rotational axis adjacent said sealing bar, a drive train synchronously rotating said camming means, said anvil and said sealing bar about their respective axes, said camming means being operative when said anvil and said gripper jaws are indexed to cam said sealing bar outwardly through the slot between said gripper jaws, said sealing bar being thus actuated into pressure contact and penetration of the web overlying said anvil to heat seal and sever the web, and means for circulating cooling liquid through said gripping jaws.

2. Apparatus for heat sealing and severing a continuously moving multiple-layered web comprising an anvil mounted for movement around a first rotational axis at one side of the web, a heated sealing bar mounted for movement around and radially of a second rotational axis in counterrotation to said anvil at the other side of the web, a drive train synchronously rotating said anvil and said sealing bar to successively index said anvil and said sealing bar across the web, a pair of heat conductive gripper jaws straddling and conjointly rotatable with said sealing bar about said second axis, springs biasing said sealing bar radially inward toward said second axis, a push rod connected to each end portion of said sealing bar, a pair of striker rollers mounted for rotative movement in the direction of movement of said anvil about a third rotational axis in the radial planes of said push rods, and a drive train synchronously rotating said striker rollers, said anvil and said sealing bar about their respective axes, said anvil and said sealing bar when moving into confronting indexed relation traveling in the same direction as the web, said rollers moving into rolling contact with said push rods during indexing of said anvil with said sealing bar to project said sealing bar outward beyond the free ends of said gripper jaws into pressure contact and penetration of the web overlying said anvil to heat seal and sever the web.

3. Apparatus according to claim 2 and a cylindrical, floating, glass cloth sleeve circumscribing said anvil to provide a web support surface that is resistant to the adherence of melted plastic, and to inhibit heat transfer from said sealing bar to said anvil.

4. Apparatus according to claim 2 wherein said anvil includes a relatively hard tetrafluoroethylene bar to minimize heat migration from said sealing bar throughout the anvil and to promote pressure contact of the sealing bar with the web.

5. Apparatus according to claim 2 wherein each of said gripper jaws defines a substantially coextensive internal cooling passage, said sealing bar mounting including an elongate shaft having a central bore, means rotatably supporting said shaft, a first swivel coupling communicating with said bore adjacent one end of said shaft, a sleeve circumscribing each of said push rods and extending across said bore in sealed relation with said shaft, a conduit communicating with each end portion of said bore and the adjacent ends of said cooling passages, and a pump connetced to said swivel coupling for injecting a cooling liquid under pressure into said bore, the adjacent one of said sleeves providing a throttling restriction in said bore which diverts a part of the cooling liquid into the adjacent conduits connected to the cooling passages of said gripper jaws, the cooling liquid thus circulating both through said sealing bar shaft and said gripper jaws to minimize heat transfer from said sealing bar into said gripper jaws.

6. Apparatus according to claim 5 and a second swivel coupling communicating with said bore adjacent the other end of said shaft, and a heat exchanger interconnecting said second swivel coupling and the suction inlet of said pump for cooling and recirculating the cooling liquid in a closed hydraulic circuit.

7. In a continuous wrapping machine a rotary sealing bar assembly comprising an elongate shaft defining a central bore and an outwardly open longitudinal slot, means rotatably supporting said shaft intermediate its ends, a heated sealing bar mounted in said slot and having a working edge projecting radially beyond the edges of said slot, a push rod connected to each end portion of said sealing bar and extending diametrically through aligned bores of said shaft, the free end of each push rod projecting outwardly beyond the opposite side of said shaft and having an enlarged striker head, a compression spring mounted on each push rod intermediate said striker head and said shaft to bias said sealing bar inward to a retracted position in its mounting slot, a sleeve circumscribing each of said push rods in sealed relation with said shaft to isolate the push rods from the bore, a pair of hollow gripper jaws mounted on said shaft in straddling relation to the working edge of said sealing bar, said gripper jaws each having an internal cooling passage and an arcuate gripping edge lying outwardly beyond the working edge of the retracted sealing bar, a swivel coupling communicating with said bore at each end of said shaft, a conduit communicating with each end portion of said bore and the adjacent ends of said cooling passages, a pump connected to one of said swivel couplings for injecting a cooling liquid under pressure into said bore, the adjacent one of said sleeves providing a throttling restriction in said bore which diverts a part of the cooling liquid into the adjacent conduits connected to the cooling passages of said gripper jaws, the cooling liquid thus circulating both through said sealing bar shaft and said gripper jaws to minimize heat transfer from said sealing bar into said gripping jaws, and a heat exchanger connecting the other swivel coupling to the suction inlet of said pump for cooling and recirculating the cooling liquid in a closed hydraulic circuit.

References Cited

UNITED STATES PATENTS

| 2,999,532 | 9/1961 | Bursak | 156—583 X |
| 3,045,403 | 7/1962 | Mitchell | 53—182 X |
| 3,054,441 | 9/1962 | Gex et al. | 156—515 |
| 3,162,564 | 12/1964 | Buchner | 156—583 X |

BENJAMIN A. BORCHELT, Primary Examiner

W. T. RIFKIN, Assistant Examiner

U.S. Cl. X.R.

53—182; 156—251, 498, 515